United States Patent [19]
Strauss

[11] 3,954,618
[45] May 4, 1976

[54] FILTER TUBE HOLDER AND FILTER ASSEMBLY

[75] Inventor: Richard Strauss, Lexington, Mass.

[73] Assignee: Whatman Reeve Angel Limited, Maidstone, England

[22] Filed: Dec. 23, 1974

[21] Appl. No.: 535,366

[52] U.S. Cl. .............................. 210/232; 210/323 T
[51] Int. Cl.² ........................................ B01D 29/10
[58] Field of Search .......... 210/232, 322, 333, 339, 210/347, 493, 494, 495, 496, 497

[56] References Cited
UNITED STATES PATENTS

| | | | |
|---|---|---|---|
| 1,969,644 | 8/1934 | Gavett | 261/124 |
| 2,017,350 | 10/1935 | Morgan | 210/232 X |
| 2,366,451 | 1/1945 | McNeal | 210/232 X |
| 2,525,287 | 10/1950 | Cuno | 210/496 X |
| 2,562,730 | 7/1951 | Miller, Jr. | 210/410 X |
| 2,819,800 | 1/1958 | Goodloe | 210/322 X |
| 2,848,112 | 8/1958 | Hass | 210/333 |
| 3,152,988 | 10/1964 | Guttowski et al. | 210/497 X |
| 3,279,608 | 10/1966 | Soriente et al. | 210/232 |
| 3,767,054 | 10/1973 | Larrar et al. | 210/232 |

Primary Examiner—Theodore A. Granger
Attorney, Agent, or Firm—Richard P. Crowley

[57] ABSTRACT

An improved filter tube holder and a filter assembly in which such holder is used, which holder is adapted to secure a filter tube about a passageway in the mounting or sealing plate of the assembly, and which holder comprises: a closed end cap element disposed on one side of a mounting plate; a mounting bar strip element disposed on the opposite side of the mounting plate; first and second arched strip elements at one and the other end of a tie rod; a end cap element with an opening at the opposite end from the disc element on the one side of the mounting plate; the closed end cap element and the open end cap element adapted to secure in a sealing manner a filter tube therebetween, the tie rod adapted to pass through the passageway and the filter tube; means to secure the first and second strip elements to the tie rod; and a means to move the closed cap element and/or the mounting bar strip element toward each other to secure the filter tube therebetween in a fluid-tight manner about the passageway in the mounting plate.

12 Claims, 4 Drawing Figures

FILTER TUBE HOLDER AND FILTER ASSEMBLY

BACKGROUND OF THE INVENTION

Filter tubes, such as nonwoven fibrous filter tubes, wherein the fibers are bonded together by a bonding agent, such as glass fibers which are bonded together using a hardenable resin, or other agent, are typically employed to filter fluids, such as gases and liquids. In some applications, one or more of such filter tubes are mounted in one or more filter tube holders and positioned within an external filter tube housing to form a filter tube assembly, so that one or a plurality of filter tubes may be employed to filter a fluid stream. The fluid to be filtered is then introduced into the interior or exteriorly of the filter tube and the fluid is filtered by passage through the filter tube wall.

Standard commercial filter tube holders typically require fabrication from rather expensive machined component parts, which parts require rather close machine tolerances. Such filter tube holders and the filter assemblies prepared therefrom are often in addition complex and difficult to assemble in the field, while the filter tube holders are not easily mounted on a flat sheet filter plate within the filter assembly. In addition, the surface of the sealing or mounting plate about the passageway often must be machined smooth to insure a fluid-tight seal of the lower end of the filter tube to the plate surface. Therefore, there exists a need for a rather simple, inexpensive, easily fabricated and assembled filter tube holder employed in a filter tube assembly.

SUMMARY OF THE INVENTION

My invention concerns an improved filter tube holder and a filter tube assembly containing one or more of such filter tube holders. In particular, my invention relates to a filter tube holder which does not require the machining of the parts, is simply and easily fabricated and assembled, does not require close machine tolerances, and is composed of inexpensive and relatively standard parts, and which filter tube holder may be easily mounted about a passageway having a rough or unmachined peripheral surface on a mounting plate within a filter tube assembly. My improved filter tube holder provides further for an axial compression of each end of a filter tube, such as an integral unitary nonwoven bonded glass fiber tube, which permits the peripheral edges of each end of the filter tube to form a fluid-tight seal against the adjacent flange elements.

In one embodiment, my filter tube holder may be composed of inexpensive, easily fabricated, rigid, polymeric component parts. Such component parts may be made of a molded typically thermoplastic polymer or resin, such as an olefin resin like polyethylene, polypropylene and similar type resinous materials. My improved filter tube holder is adapted particularly to be employed with nonwoven glass fiber filter tubes, such as those filter tubes as described and set forth in U.S. Pat. No. 3,767,054. My filter tube holder may be employed alone or in particular with a plurality of other filter tube holders of the same or different type in an external housing to form a filter tube assembly.

My improved filter tube holder and filter assembly are particularly useful in the filtration of low-pressure gaseous streams at high efficiencies and at high flow rates with low pressure drops. My improved filter tube holder is particularly suitable for use with fibrous filter tubes of nonwoven, borosilicate glass fibers bonded together with a bonding agent, such as a hardened resin like phenol-formaldehyde or epoxy resin. such glass fiber filter tubes are typically composed of glass fibers, particularly borosilicate glass fibers, having a diameter of from about 0.001 to 10 microns; for example, 0.03 to 8 microns in diameter. Such filter tubes are so composed so that they are selfsupporting, and upon axial compression of the ends of the filter tube against a solid surface, form a fluid-tight seal without the absolute necessity of employing gaskets, although end-sealing gaskets may be employed if necessary or desired. My filter tube holders are particularly designed for such nonwoven glass fiber filter tubes; however, they may also be employed with other filter tubes.

In the preferred embodiment, my improved filter tube holder may employ all polymeric or plastic component parts, which permit such holder to be fabricated easily and inexpensively, and additionally, prevent corrosion of the holders where acidic-type fluids, such as liquids or gases, are employed or are necessary to be filtered. However, my filter tube holder may be fabricated of any material of construction, such as steel, stainless steel, or aluminum as desired.

My invention permits a tie rod to be placed easily and secured rigidly within the central interior of a filter tube and within the passageway of a sealing or mounting plate about which the lower edge end of the filter tube is to be sealed. My filter tube holder permits the tie rod to be positioned easily without blocking the passageway, and to be secured rigidly and easily in the field to the mounting plate. My holder permits the lower end of the filter tube to be engaged in a fluid-tight manner about the mounting plate passageway, even though the peripheral surface about the passageway is not smooth; for example, is not machined smooth or otherwise treated, fabricated or arranged to form a fluid-tight seal with the end of the tube. My holder in the described embodiment provides for the mounting of the filter tube in the field with only a wrench, and avoids the necessity of machining the metal peripheral surface of the mounting plate.

My filter tube holder is adapted to secure a filter tube adapted to filter a fluid stream about a filter tube passageway in the mounting plate of a filter tube housing, which filter tube holder comprises: a solid end disc or closed end cap element; a tie rod having a one end and another end and adapted to be positioned within the filter tube and to extend through the filter tube passageway of the mounting plate; means to secure the disc element for axial movement to the tie rod; mounting means adapted to be positioned on the opposite side of the passageway of the mounting plate from the disc element, and of insufficient dimensions to block flow of the fluid stream to be filtered through the passageway; means to secure the other end of the tie rod to the mounting bar element; a peripheral ring or end cap with an opening element characterized by an upper and lower face surface and adapted to be positioned about the filter tube passageway of the mounting plate, and including means to form a fluidtight seal between its lower face surface and the peripheral face surface of the mounting plate about the passageway; a first strip element extending across the ring element and characterized by a hold through which the tie rod passes, the strip element insufficient in dimensions to block the flow of the fluid stream to be filtered within the filter tube; and means to move the disc element or the mounting means, or both, axially along the tie rod, whereby a filter tube positioned between the upper face surface of the ring element and a surface of the disc element may be securely held and positioned in a fluid-tight manner about a filter tube passageway in a mounting plate.

The ring element may be used with or without a lower sealing gasket to secure a fluid-tight seal to the surface of the mounting plate, while the ring element upper surface serves as a seating surface for the lower edge of the filter tube.

Thus, my invention comprises the method and apparatus of securing my filter tube holder with a tie rod to a mounting plate within a housing, with simple component parts and without the necessity of machining the peripheral surface about the passageway of the plate.

DESCRIPTION OF THE EMBODIMENTS

Figure 1:
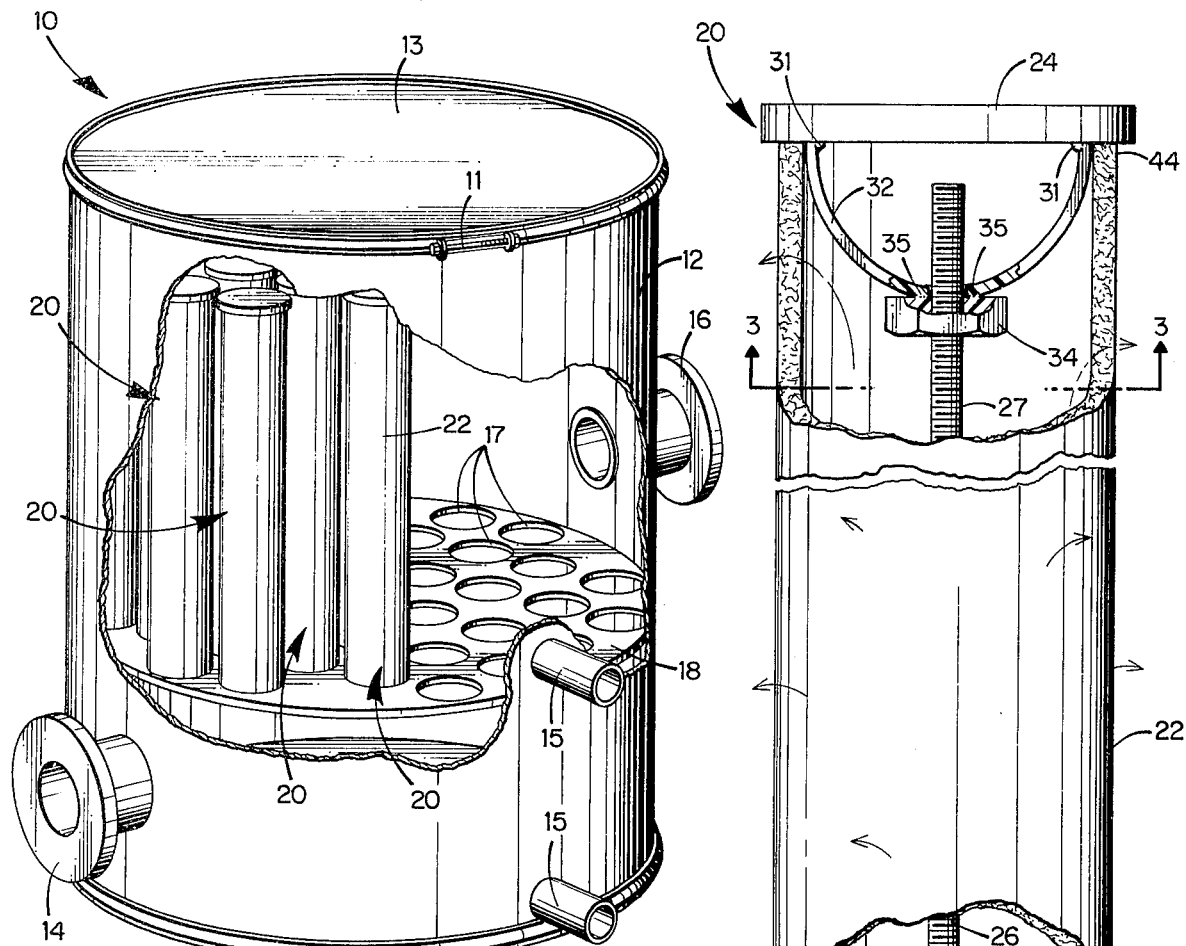
FIG. 1 is a perspective partially cutaway view of a filter tube assembly employing a plurality of my filter tube holders therein.

FIG. 1 illustrates a filter tube assembly 10 which comprises an external housing element 12 formed, for example, from a fifty-five-gallon drum which comprises a drum cover 13, a means 11 to secure the cover, an inlet 14 for the introduction of a fluid to be filtered, such as a gas, drain outlets 15, an outlet 16 for the removal of the filtered fluid, a metal mounting plate 18 characterized by a plurality of circular passageways therein 17, the mounting plate secured in a fluid-tight manner to the internal wall of the housing 12, and a plurality of my filter tube holders 20 containing glass fiber filter tubes mounted therein 22. As illustrated, the filter tube holders are shown containing filter tubes mounted on the filter tube holders about only a few of the passageways for the purpose of illustration only; however, it is recognized in operation that the filter tubes in the filter tube holders would be mounted about each circular passageway 17. Of course, if desired and optionally, the flow of the fluid, rather than being as described in FIG. 1 wherein the fluid is introduced into the inside of each of the filter tubes 22, may be reversed so that the fluid is introduced into the element 16 and the filtered fluid is removed from the inlet 14.

Figure 2:
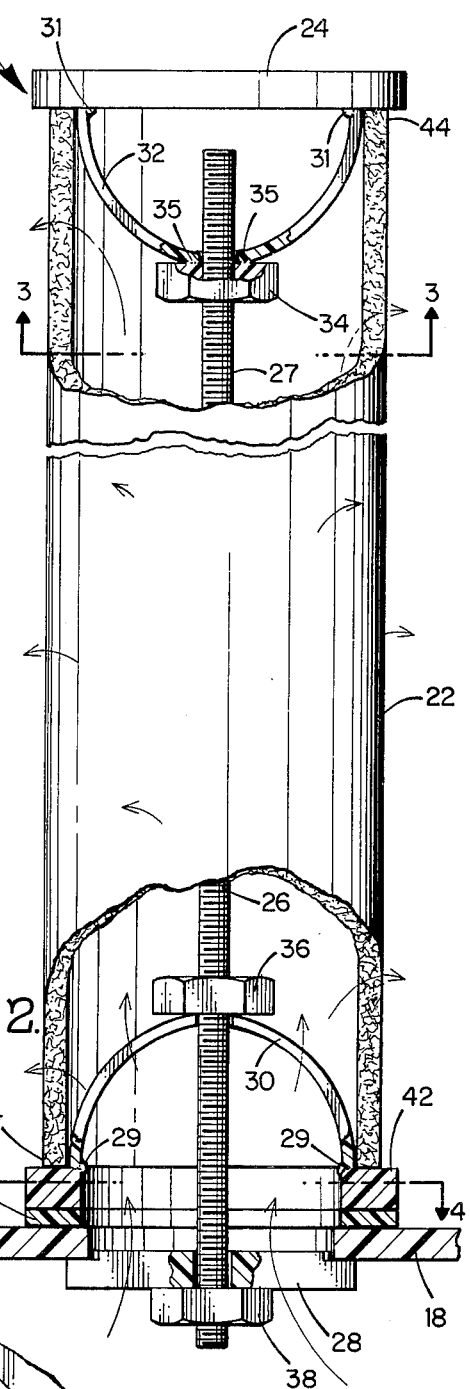
FIG. 2 is a schematic representative cross-sectional view of the filter tube holder of my invention.
Figure 3:
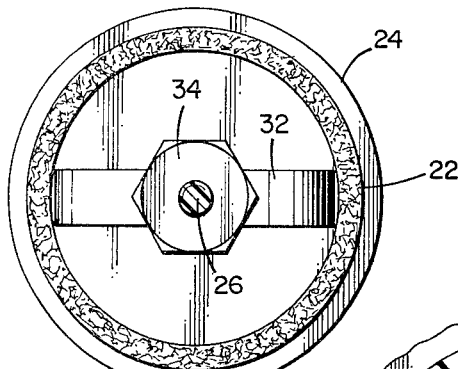
FIG. 3 is a cross-sectional view along lines 3—3 of the filter tube holder of FIG. 2.
Figure 4:
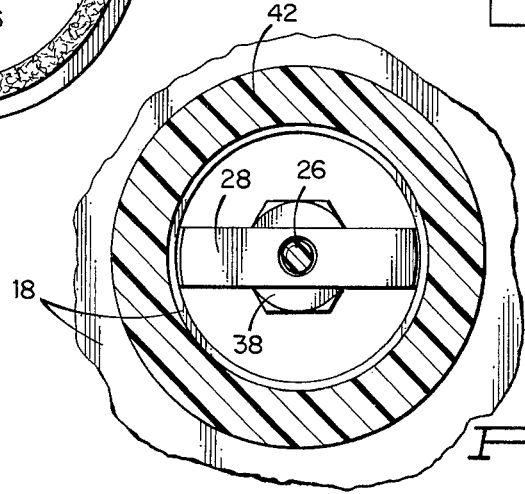
FIG. 4 is a cross-sectional view along lines 4—4 of the filter tube holder of FIG. 2 of my invention.

FIGS. 2, 3 and 4 illustrate my improved filter tube holder 20, which is illustrated in the filter assembly 10 of FIG. 1. My filter tube holder 20 is illustrated containing a nonwoven, selfsupporting, unitary, borosilicate, resin-bonded, glass filter tube 22 wherein the fibers at each end of the filter tube 22 have been compressed axially to form a peripheral end region 44 of compressed fibers wherein the peripheral edges of each end of the filter tube 22 form a fluid-tight seal against the surface adjacent the edges.

The holder as illustrated employs a series of plastic component parts; for example, formed from polypropylene; however, it is recognized and is a part of my invention that the component parts may be formed of other plastic or nonplastic materials. The filter tube holder 22 includes an end cap element 24, such as a solid disc, the peripheral edge of the filter tube at the upper end disposed and compressed in use against the lower surface of the disc element. The holder also includes a threaded tie rod 26, with the threads illustrated 27, and a lower mounting bar 28 notched or undercut as illustrated at each end thereof, the notches adapted to center the bar in the circular passageway 17 in the mounting plate 18 of the filter tube assembly 10. Arcuate, semicircular, strip elements 30 and 32 are shown at each end of the tie rod 26, the strip elements having a central passageway therein through which the tie rod passes. Threadable interior nuts 34, 36 and 38 are illustrated and are threadably secured as shown to the threaded tie rod 26.

At the other and lower end of the filter tube 22 is disposed a base ring element or end cap element with an opening 42 with a flat peripheral sealing rubber gasket 40, such as a gasket composed of neoprene or ethylene-propylene rubber material. The gasket 40 provides for a fluid-tight seal between the rough unmachined upper surface or the mounting plate 18 about the passageway 17 and the ring element 42. The ring element 42 and gasket 40 are employed in the preferred embodiment illustrated to avoid the necessity of treating, machining or otherwise smoothing the upper surface of the mounting plate 18, which would be required if the filter tube 22 has its lower edge placed directly in contact with the surface, since the compression of the filter tube would not then provide a fluid-tight seal, which is provided when the lower end of the filter tube is compressed against the smooth upper face surface of the ring element 42. Of course and if desired, although not preferred, the gasket 44 may be removed and the lower surface of the ring 42 or the lower peripheral edge of the filter tube 22 placed directly in contact with a smooth, such as a machined, peripheral surface of the mounting plate to provide for a fluid-tight seal.

The nut elements 34 and 36 are threadably positioned and movable on the tie rod 26. The upper nut element 34 is secured to a semicircular strip element 32. The strip element is tacked either as shown to the outside of the semicircle or the nut element 34 may be placed inside of the semicircle and tacked thereon. The securing of the nut 34 to the strip 32 is accomplished through bonding 35 wherein the polymeric parts are secured through adhesives, heat welding, ultrasonic welding or other means. The strip element 32 is bent typically in a semicircle, and each end of the element is secured, such as by tacking as before, to the lower surface of the disc element 27 through tack welds 31 and typically just within the inside diameter of the filter tube 22. The arcuate strip 30 serves as a means to position and hold the tie rod 26 centrally of the ring element 42.

The end disc element can be of any design which threads or is movably secured to the tie rod, and which permits sealing of the end of the filter tube 22 by axial compression. For example, the disc may have threads machined therein, so that it can be threaded onto and removed from the tie rod 26. Another design employs a disc with a hole in the center thereof through which the tie rod is extended, with a sealing gasket and threaded nut on top. The exact design of the end-sealing disc may vary, provided it permits the removal of the disc element so that a filter tube may be placed in the holder, and the compression of the filter end through axial movement of the disc element. Of course, the tie rod need not be threaded or threaded in its entirety with all such disc design.

The ring element 42, tie rod 26 and disc element are secured about the mounting plate passageway by the tightening and use of the mounting bar on the opposite lower side. The mounting bar is one preferred design which permits the flow of air into and onto the interior of the filter tube 22; however, other mounting means to secure the filter tube holder can be employed, such as, for example, the use of the ring element 42 on the opposite side or other means which extends outside of the interior diameter of the passageway to hold the tie rod rigidly in its central position and which does not unduly interfere with the flow of the fluid.

At the lower end of the tie rod, the nut 36 is threadably positioned to retain a bent arcuate strip element 30, with the tie rod passing through a hole in the center of the strip element 30, and wherein each end of the strip element is similarly secured, such as by tacking 29, to the opposing inside peripheral ring element 42 and also within the inside diameter of the filter tube 22. The upper peripheral face surface of the ring element 42 is smooth and serves as a seat for the lower edge of the filter tube 22.

The strips 30 and 32 are bent into an arcuate generally tensional position as illustrated, with the strip element 32 secured to the disc 24. The disc element may be moved in an axial manner. The filter tube is inserted in the holder and then the disc 24 moved threadably inwardly in order to place the filter tube 22 in a secured holding position. In addition, the tacked outer edges of each of the strip elements 30 and 32 provide some support against any inward movement of the lower and upper adjacent peripheral inside diameter of the filter tube 22 at each end 44 thereof. The nut element 36 need not be secured to the strip element 30, but merely positioned to retain the strip element in its tensional position as illustrated. Nut 38 on movement provides compression at each end 44 of the filter tube 22. The mounting bar 28 is notched in order to provide for easy insertion of the mounting bar in the circular passageway 17 in the mounting plate 18. The flow path of the fluid into the interior of the filter tube 22 in the filter tube holder 20 is illustrated by the flow arrows.

In operation, a filter tube 22 is inserted into the holder device 20 through the removal of the solid disc element 24 which includes the strip element 32 and the nut 34. After insertion of the filter tube element, the disc element 24 is then screwed onto the threaded tie rod 26 and tightened to apply axial pressure against the end of the filter tube 22, or, if desired, the nut element 36 may also be tightened alone or in combination with the disc element 24 to provide for axial compression of each end of the filter tube. As illustrated, a separate nut element 38 is employed to tighten the mounting bar 24 against the lower upper side of the mounting plate; however, it is recognized that the mounting plate 28 may be internally threaded in relationship to the threads 27 of the tie rod 26, or otherwise secured to the tie rod, or, for example, with tightening adjustments made solely by axial movement of the disc element 24.

On axial compression, each of the peripheral ends of the filter tube 22 are compressed 44 to form a fluid-tight seal against the respective upper surface of the ring element 42 and the lower surface of the disc element 44. If desired, the filter tube 22 may be used in combination with peripheral molded sealing gaskets like 40 employed at each end and adjacent to the peripheral edges of the filter tube 22 where the filter tube does not form a sealing-type gasket and where additional gaskets are desired and necessary.

In operation, a fluid, such as a gas, to be filtered, such as a refinery gas, is introduced into the interior of the filter assembly through inlet 14 and upwardly into the interior of the filter tube 22 and the filtered gas removed from the outlet 16. A typical gas would include, for example, one having a high flow; for example, over 1000 cubic feet per second, such as one having 1500 cubic feet per second, and which has a low pressure; for example, less than 2 psi.; therefore, requiring a low-pressure drop filter operation.

In one embodiment, my filter tube holder is composed of rigid, thermoplastic, inexpensive, noncorrosive polymers, and therefore does not require machining operations and close tolerances which are often necessitated by other prior art filter tube holders. Such filter tube is also characterized by being easily fabricated to form the component parts.

My invention has been described for the purpose of illustration only in a particular embodiment. It is recognized and is a part of my invention that changes and modifications may be made to my illustrated embodiment without departing from the spirit and scope of my invention.

What I claim is:

1. A filter tube assembly which comprises in combination:
   a. a closed housing which includes
      i. an inlet to introduce a fluid stream to be filtered into the interior of the housing,
      ii. an outlet to remove the filtered fluid stream from the interior of the housing, and
      iii. a mounting plate within the housing to separate the inlet and outlet in a fluid-tight manner, the plate characterized by at least one filter tube passageway therein; and
   b. a filter tube holder to secure a filter tube to filter the fluid stream about the filter tube passageway, which holder comprises
      i. a first closed end cap having an inner face surface,
      ii. a second end cap with an opening therein having upper and lower face surfaces, and arranged circumferentially about the opening of the filter tube passageway to form a fluid-tight seal between the lower face surface and the circumferential surface of the passageway,
      iii. a rod element having a one end and another end, and arranged to be positioned within the filter tube, and which extends through the filter tube passageway,
      iv. means to secure the first end cap to the one end of the rod element,
      v. a mounting bar arranged on the opposite side of the filter tube passageway of the plate from the first end cap, arranged to extend across the passageway, and characterized by a central opening into which the other end of the rod element extends, and which bar permits flow of the fluid stream through the passageway,
      vi. a first arcuate strip element characterized by a central opening therein through which the rod element extends, and constructed and arranged to be located within the filter tube, with the opposite ends of the arcuate strip secured to the inner circumference of the second end cap and less than the inner diameter of the filter tube, which arcuate strip permits flow of the fluid stream within the filter tube, and vii. wherein the means to secure the first end cap or the mounting bar includes means to move the mounting bar or first end cap, or both, axially along the rod element, whereby a filter tube may be held in a fixed position between the upper face surface of the second end cap and the lower face surface of the first end cap, and in a fluid-tight manner about the filter tube passageway of the mounting plate, with the mounting bar securing the holder to the mounting plate.

2. The assembly of claim 1 wherein the filter tube holder includes a sealing gasket between the circumferential surface about the filter tube passageway and the lower face surface of the second end cap.

3. The assembly of claim 1 wherein the filter tube holder includes a mounting bar which is centrally arranged in the passageway and undercut at each end thereof facing the mounting plate to secure the bar centrally in position in the filter tube passageway of the mounting plate.

4. The assembly of claim 1 wherein the rod element has a threaded surface at the one and the other end, and the means to secure the first end cap or the means to secure the mounting bar, or both, to the rod element are threadably movable along the rod element, thereby permitting the filter tube to be secured to or released from the filter tube holder and the passageway.

5. The assembly of claim 1 wherein the rod element has a threaded surface at the one and the other end, and wherein the means to secure the first end cap to the rod element comprises a second arcuate strip characterized by a central opening through which the one end of the rod element extends, the arcuate strip constructed and arranged to be located within the filter tube, with the opposite ends of the arcuate strip secured to the inner circumference of the first end cap and less than the inner diameter of the filter tube, and a nut element about the central opening of and secured to the second arcuate strip and threadably arranged at the one end on the rod element, whereby the second arcuate strip and nut element are axially movable along the one end of the rod element to secure the filter tube in the holder.

6. The assembly of claim 1 wherein the rod element has a threaded surface at the other end, and wherein the means to secure the mounting bar to the plate comprises a nut element threadably secured to the other end of the rod element.

7. The assembly of claim 1 which includes a filter tube secured between the inner face surface of the first end cap and the upper face surface of the second end cap.

8. The assembly of claim 1 which includes a self-supporting, nonwoven, glass-fiber filter tube rigidly secured in a fluid-tight manner between the inner face surface of the first end cap and the upper face surface of the second end cap, and wherein a fluid-tight seal at each end of the filter tube is provided by the compression of the peripheral compressible end edges of the filter tube between the first and second end cap surfaces.

9. The assembly of claim 1 wherein the end caps are composed of a hard polymeric material, and the inner face surface of the first end cap and the upper face surface of the second end cap are smooth surfaces to provide a fluid-tight seal between the ends of the filter tube secured therebetween.

10. The assembly of claim 1 wherein the rod element comprises a threaded surface at the one and the other end, and the means to secure the first end cap at the one end and the mounting bar at the other end are threadably secured to the rod at the respective ends, both for axial movement along the respective ends of the rod element.

11. A low pressure, high-flow, filter tube assembly for the filtering of gases which comprises in combination:

a. a closed housing which includes
  i. an inlet to introduce a gas stream to be filtered into the interior of the housing,
  ii. an outlet to remove the filtered gas stream from the interior of the housing, and
  iii. a mounting plate wtihin the housing to separate the inlet and outlet in a fluid-tight manner, the plate characterized by a plurality of filter tube passageways therein;
b. filter tube holders to secure filter tubes about each of the passageways;
c. filter tubes secured in each filter tube holder to filter the gas; and
d. each of the filter tube holders comprising
  i. a first closed end cap having an inner face surface,
  ii. a rod element having a threaded surface at the one end and the other end, and centrally positioned within the filter tube, and which extends at the other end through the filter tube passageway in the plate,
  iii. a second end cap with an opening therein having upper and lower face surfaces, and positioned circumferentially about the passageway,
  iv. a sealing gasket between the lower face surface of the second end cap and the circumferential surface about the passageway of the plate to provide a fluid-tight seal,
  v. a mounting bar arranged on the opposite side of the filter tube passageway from the first end cap, and characterized by a central opening therein into which the other end of the rod element extends, and undercut at opposite ends to be positioned centrally in the passageway,
  vi. means to secure the mounting bar for axial movement on the other end of the rod element,
  vii. a first arcuate strip element characterized by a central opening therein through which the rod element extends, and constructed and arranged to be located within the filter tube, with the opposite ends of the arcuate strip secured to the inner circumference of the second end cap and less than the inner diameter of the filter tube, which arcuate strip permits flow of the gas stream within the filter tube,
  viii. a nut element threadably secured to the other end of the rod element to secure the first arcuate strip element in position, and
  ix. a second arcuate strip element characterized by a central opening through which the one end of the rod element extends, the arcuate strip constructed and arranged to be located within the filter tube, with the opposite ends of the arcuate strip secured to the inner circumference of the first end cap and less than the inner diameter of the filter tube, and a nut element about the central opening of and secured to the second arcuate strip and threadably arranged at the one end on the rod element, whereby the second arcuate strip and nut element are axially movable along the one end of the rod element to secure the filter tube in the holder,
whereby the filter tube is secured in the holder in a fluid-tight manner about the filter tube passageway by the threaded axial movement along the one or the other end of the rod element of the first end or the mounting bar, respectively, or both, the mounting bar securing the holder and filter tube to the mounting plate.

12. The filter tube assembly of claim 11 wherein the filter tube includes a self-supporting, nonwoven, glass-fiber filter tube rigidly secured in a fluid-tight manner between the inner face surface of the first end cap and the upper face surface of the second end cap, and wherein a fluid-tight seal at each end of the filter tube is provided by the compression of the peripheral compressible end edges of the filter tube between the first and second end cap surfaces.

* * * * *